United States Patent
Hazeghi et al.

(10) Patent No.: US 9,778,476 B2
(45) Date of Patent: Oct. 3, 2017

(54) 3D DEPTH SENSOR AND PROJECTION SYSTEM AND METHODS OF OPERATING THEREOF

(71) Applicant: Aquifi, Inc., Palo Alto, CA (US)

(72) Inventors: Aryan Hazeghi, Palo Alto, CA (US); Carlo Dal Mutto, Sunnyvale, CA (US)

(73) Assignee: Aquifi, Inc., Palo Alto, CA (US)

( * ) Notice: Subject to any disclaimer, the term of this patent is extended or adjusted under 35 U.S.C. 154(b) by 196 days.

(21) Appl. No.: 14/743,742

(22) Filed: Jun. 18, 2015

(65) Prior Publication Data

US 2016/0127713 A1    May 5, 2016

Related U.S. Application Data

(60) Provisional application No. 62/074,592, filed on Nov. 3, 2014, provisional application No. 62/133,252, filed on Mar. 13, 2015.

(51) Int. Cl.

| | |
|---|---|
| *G02B 27/00* | (2006.01) |
| *G02B 27/30* | (2006.01) |
| *G02B 27/42* | (2006.01) |
| *G01B 11/00* | (2006.01) |
| *H04N 5/225* | (2006.01) |

(52) U.S. Cl.
CPC .............. *G02B 27/30* (2013.01); *G01B 11/00* (2013.01); *G02B 27/0075* (2013.01); *G02B 27/4205* (2013.01); *H04N 5/2256* (2013.01)

(58) Field of Classification Search
CPC .......... G01C 3/08; G02B 27/00; G02B 27/30; G02B 27/42; H04N 13/02
See application file for complete search history.

(56) References Cited

U.S. PATENT DOCUMENTS

| | | |
|---|---|---|
| 5,808,775 A | 9/1998 | Inagaki et al. |
| 6,236,509 B1 | 5/2001 | Grandjean et al. |
| 7,970,177 B2 | 6/2011 | St. Hilaire et al. |
| 8,630,039 B2 | 1/2014 | Shpunt |
| 8,749,796 B2 | 6/2014 | Pesach et al. |
| 8,995,057 B2 | 3/2015 | Miyasaka et al. |
| 2002/0071472 A1 | 6/2002 | Dickson et al. |
| 2002/0196415 A1 | 12/2002 | Shiratani |
| 2003/0231511 A1 | 12/2003 | Thibault |
| 2005/0002026 A1 | 1/2005 | Hoff et al. |
| 2009/0109349 A1* | 4/2009 | Kanai ...................... G03H 1/08 348/744 |
| 2009/0185274 A1* | 7/2009 | Shpunt ............... G02B 27/0944 359/558 |
| 2010/0073461 A1 | 3/2010 | Hammes et al. |

(Continued)

FOREIGN PATENT DOCUMENTS

WO   WO 2005/050285 A1   6/2005

OTHER PUBLICATIONS

International Search Report and Written Opinion for Application No. PCT/US16/22179 dated Nov. 28, 2016 (10 pages).

*Primary Examiner* — Sultan Chowdhury
*Assistant Examiner* — Danell L Owens
(74) *Attorney, Agent, or Firm* — Lewis Roca Rothgerber Christie LLP

(57) ABSTRACT

A diffractive optical element includes: a first facet configured to perform an expansion optical function; and a second facet configured to perform a collimation optical function and a pattern generation function.

16 Claims, 10 Drawing Sheets

(56) References Cited

U.S. PATENT DOCUMENTS

2010/0284082 A1 11/2010 Shpunt et al.
2013/0294468 A1 11/2013 Sridharan et al.
2015/0234291 A1 8/2015 Patra et al.

* cited by examiner

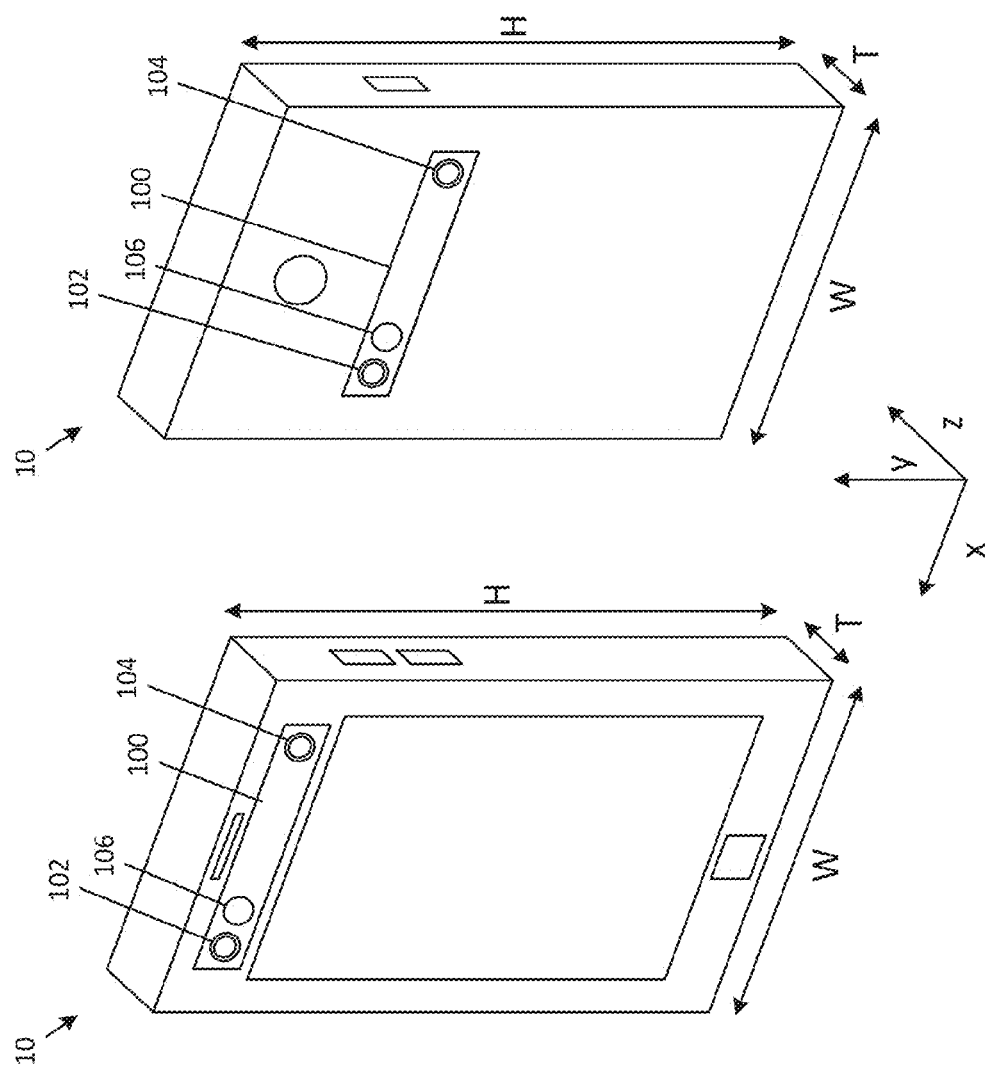

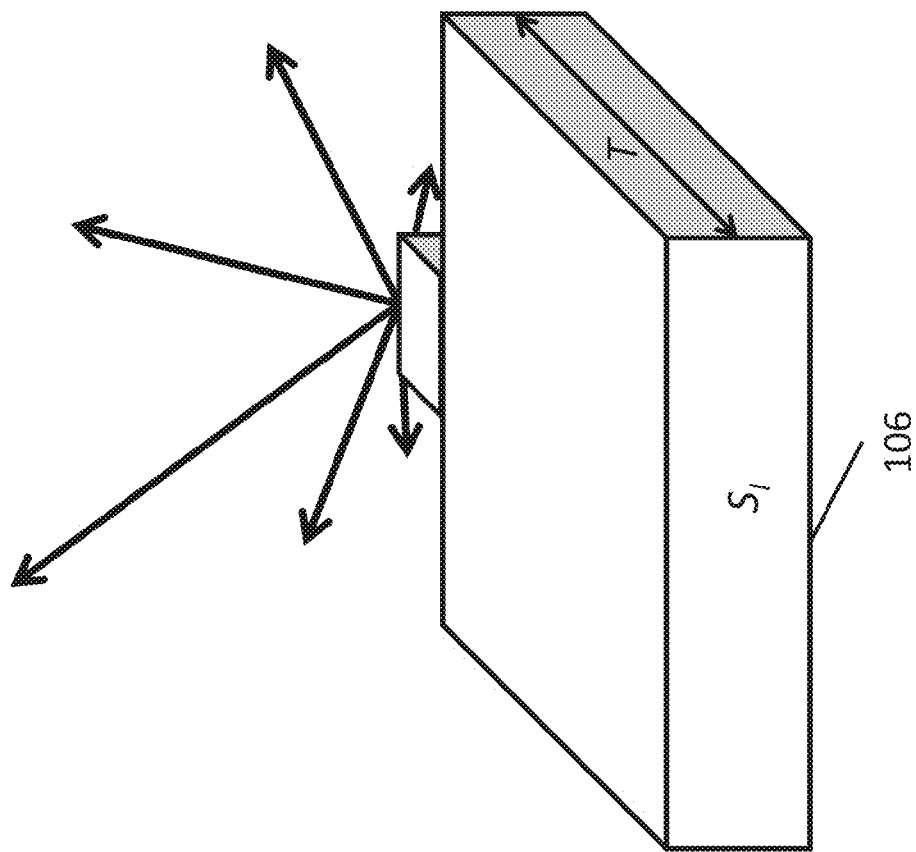
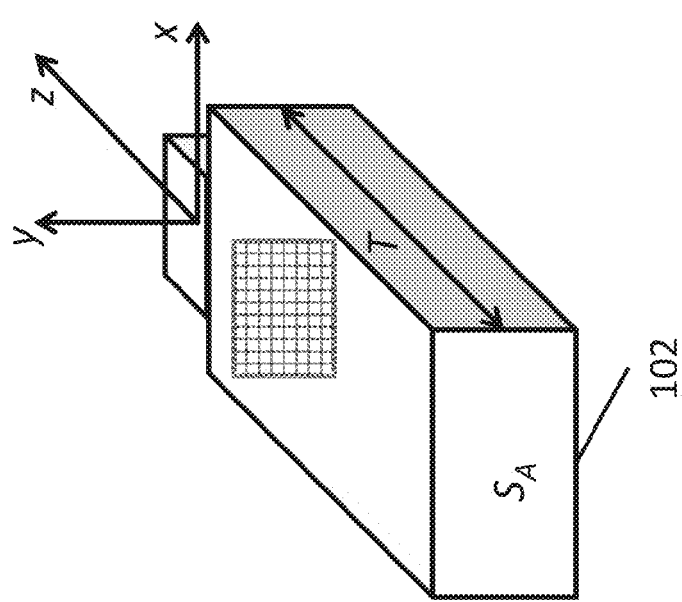
FIG. 3C

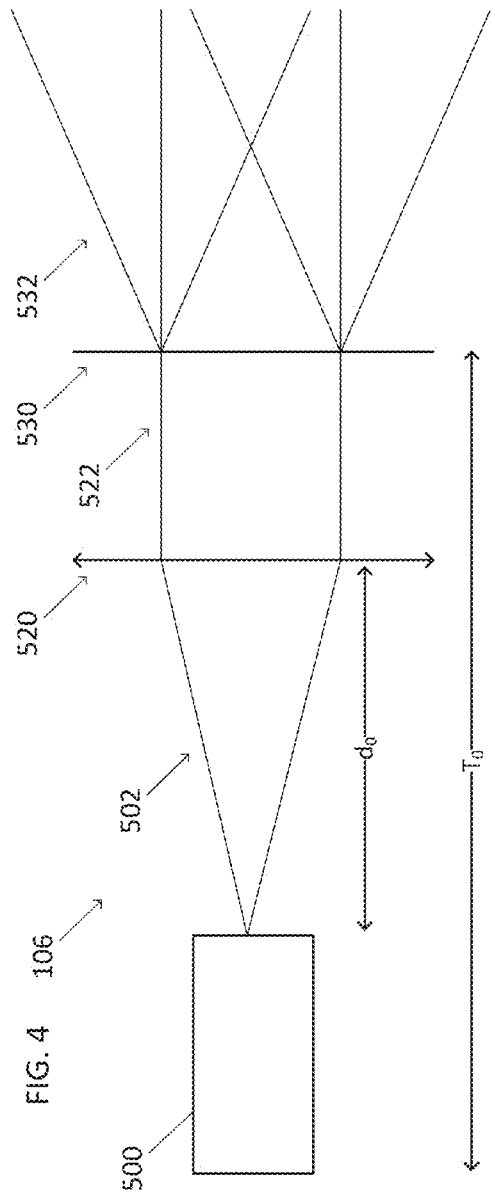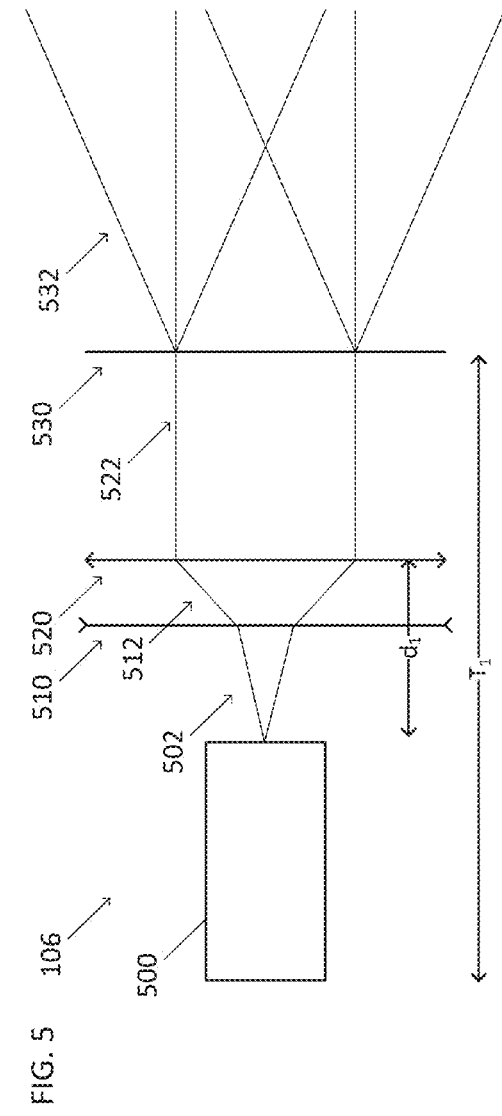

3D DEPTH SENSOR AND PROJECTION SYSTEM AND METHODS OF OPERATING THEREOF

CROSS-REFERENCE TO RELATED APPLICATION(S)

This application claims the benefit of U.S. Provisional Patent Application No. 62/074,592, titled "Systems and Methods for Reducing Z-Thickness and Zero-Order Effects in Consumer Depth Cameras," filed in the United States Patent and Trademark Office on Nov. 3, 2014, and U.S. Provisional Patent Application No. 62/133,252, titled "Ultrathin 3D Depth Sensor and Projection System," filed in the United States Patent and Trademark Office on Mar. 13, 2015, the entire disclosures of both of which are incorporated herein by reference.

This application is related to "Systems and Methods for Reducing Z-Thickness and Zero-Order Effects in Depth Cameras," application Ser. No. 14/743,738, filed in the United States Patent and Trademark Office on even date herewith, the entire disclosure of which is incorporated herein by reference.

BACKGROUND

The need for producing good quality high resolution depth data is growing on variety of electronic devices including mobile, home entertainment, gaming, robots, drones, cars, etc. The depth data is used in many imaging and detection applications in consumer and industrial markets.

Depth camera systems can be used to capture a scene and estimate the depth (or "z-distance") of each pixel in a scene, thereby generating a "depth map," an example of which is shown in FIG. 1. Some depth camera systems utilize stereo vision techniques (e.g., using multiple cameras) in which depth data is computed based on the disparity between matching features found in the images captured by the multiple cameras. However, in low light or low texture environments, it may be difficult to detect such features.

Generally depth camera systems (or more simply "depth cameras") can be classified into passive depth cameras and active depth cameras.

Active depth cameras generally include an illumination component which emits light onto a scene. Broadly, these include: "time-of-flight" active depth cameras, which emit diffuse modulated illumination onto the scene; and "structured light" active depth cameras, which emit an illumination pattern in order to project a textured pattern onto the scene, which assists in the determination of the disparities for general cases (e.g., by providing additional texture to low texture objects), and which also allows operation under insufficient ambient lighting (e.g., in dark environments).

Generally, an active depth camera includes an active illumination component (or projection module or projector) $S_I$, an image acquisition component $S_A$, and a processing component $S_P$, where the processing component implements a depth estimation algorithm. The illumination system $S_I$ illuminates the scene with diffuse or collimated light, which can be constant over time, pulsed, or otherwise modulated. The illumination may be concentrated in at a single wavelength or span a range of wavelengths. The image acquisition component $S_A$ is configured to image a scene in the direction along which the active illumination component $S_I$ emits light (e.g., the emission optical axis or the projection optical axis).

SUMMARY

Aspects of embodiments of the present invention are directed to depth camera systems having reduced thickness and methods of operating the same. Some aspects of embodiments of the present invention are directed to illumination components having a reduced thickness, and some aspects of embodiments of the present invention are directed to an integrated optical element performing multiple functions.

According to one embodiment of the present invention, a projection system is configured to emit patterned light along a projection optical axis, the projection system including: a diffractive optical element having a first facet and a second facet, the first facet being configured to perform an expansion optical function and the second facet being configured to perform a collimation optical function and a pattern generation function; and a light emitter configured to emit light toward the diffractive optical element, wherein the collimation optical function is configured to collimate the light emitted from the light emitter and wherein the pattern generation function is configured to replicate the collimated light to produce the patterned light.

The collimation optical function of the diffractive optical element may be a bi-focal collimation function.

The bi-focal collimation function may generate optical aberrations and the expansion optical function may correct the optical aberrations.

The expansion optical function of the diffractive optical element may define an effective focal length (f) and a focal point at a distance (d) from the diffractive optical element, the effective focal length being larger than the distance, and the light emitter may be located at the focal point at the distance (d) from the diffractive optical element.

The projection system may have a thickness less than 3.2 mm and the patterned light may have a beam divergence less than $4.0 \times 10^{-3}$ radians.

The collimation optical function may be spherical and the patterned light may include a plurality of points.

The collimation optical function may be cylindrical and the patterned light may include a plurality of lines.

The light emitter may be a coherent light source.

The light emitter may be a light emitting diode.

The projection system may be a component of a depth acquisition system, the depth acquisition system further including a camera configured to image a scene in a direction of the projection optical axis.

The camera may be a stereo camera.

According to one embodiment of the present invention, a diffractive optical element has: a first facet configured to perform an expansion optical function and a second facet configured to perform a collimation optical function and a pattern generation function.

The pattern generation function and the collimation optical function may be superimposed on the second facet.

According to one embodiment of the present invention, a method for applying patterned light to a scene includes: supplying power to a light emitter configured to emit monochromatic light toward a diffractive optical element, the diffractive optical element having a first facet and a second facet, the first facet being configured to perform an expansion optical function and the second facet being configured to perform a collimation optical function and a pattern generation function; expanding, by the expansion optical function, the light emitted from the light emitter to generate divergent light; collimating, by the collimation optical function, the divergent light to generate collimated light; and replicating, by the pattern generation function, the collimated light to produce the patterned light.

The collimation optical function of the diffractive optical element is may be a bi-focal collimation function.

The bi-focal collimation function may generate optical aberrations and the expansion optical function may correct the optical aberrations.

The expansion optical function of the diffractive optical element may define an effective focal length (f) and a focal point at a distance (d) from the diffractive optical element, the effective focal length being larger than the distance, and the light emitter may be located at the focal point at the distance (d) from the diffractive optical element.

The collimation optical function may be spherical and the patterned light may include a plurality of points.

The collimation optical function may be cylindrical and the patterned light may include a plurality of lines.

The light emitter may be a coherent light source.

BRIEF DESCRIPTION OF THE DRAWINGS

The accompanying drawings, together with the specification, illustrate exemplary embodiments of the present invention, and, together with the description, serve to explain the principles of the present invention.

FIG. 3A is a schematic illustration of a computing device having an integrated front facing depth acquisition system.

FIG. 3B is a schematic illustration of a computing device having an integrated rear facing depth acquisition system.

FIG. 3C is a schematic diagram of an image acquisition component $S_A$ and an active illumination component $S_I$, with x, y, and z axes labeled.

FIG. 4 is a schematic illustration of an active illumination system for emitting patterned light in an illumination pattern.

FIG. 5 is a schematic illustration of another active illumination system for emitting patterned light in an illumination pattern, the system having a reduced size along the optical axis.

DETAILED DESCRIPTION

Figure 1:
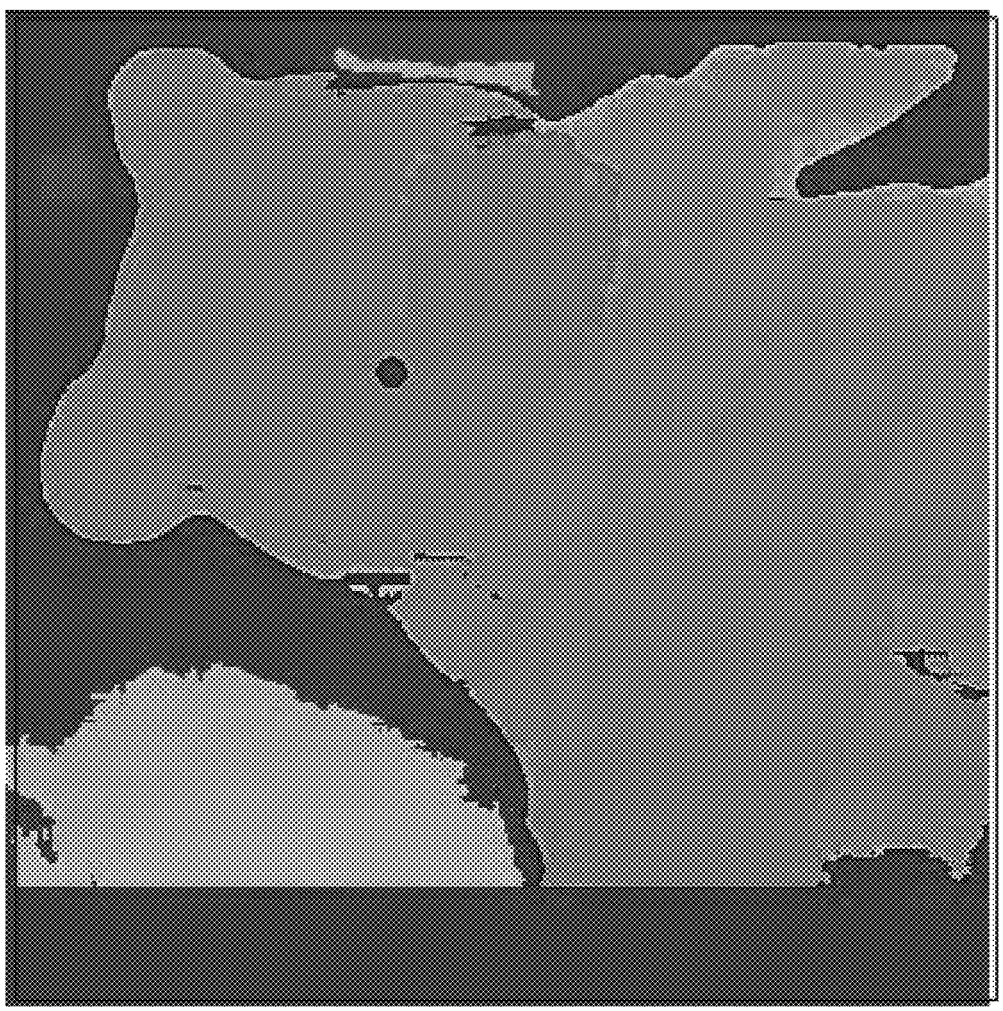
FIG. 1 is an example of a depth map generated by a depth camera.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to a systems and methods enabling an active depth camera system having a small thickness (T) or small z-height. Some aspects of embodiments of the present invention are directed to an active illumination component having a small thickness or small z-height through the use of an optical element performing a function that shortens the distance required between the optical element and a light emitter, thereby reducing the thickness of the device. In addition, in some embodiments of the present invention, the optical element performs multiple functions, thereby reducing the number of optical elements necessary in the system and thereby reducing the complexity and thickness of the system.

Aspects of embodiments of the present invention are directed to a miniaturized, thin projection system which can be used in structured light and active stereo 3D depth sensing, and which may be particularly suitable for, although not limited to, mobile applications. In some embodiments of the present invention, the projection system or active illumination component includes a hybrid optical element (HOE) which integrates at least three optical functions (or lens functions) into a single physical component.

In the following discussion, the term "package thickness" will be used to refer to the physical thickness (T) of the active illumination component (or pattern projection package) along, for example, the direction of the optical axis of the illumination component. The active illumination component may commonly be mounted on a support structure such as a printed circuit board (PCB) or a mechanical mount within a computing device 10 (e.g., a smartphone).

In addition, the term "optical function" will be used to refer to an optical operation, as distinguished its "physical implementation" because any particular physical device may have a single structure that performs multiple optical functions.

The term "working distance" will be used to describe the distance measured from the active illumination component to the scene or an object of interest in the scene. For example, the scene may be of an office with a person (the user) and the object of interest may be the user's hand. The term "operating range" will be used to refer to the maximum working distance at which the system can operate within particular performance metrics.

Figure 2:
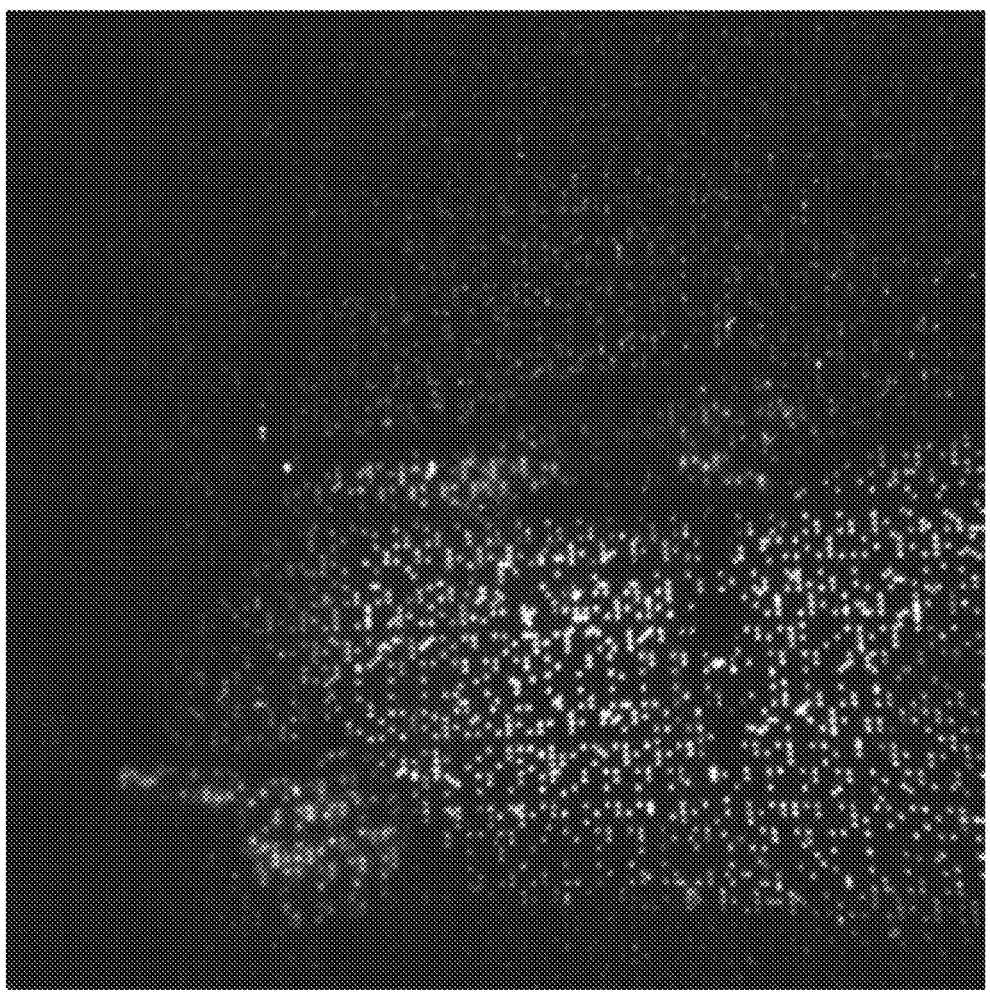
FIG. 2 is an example of a pattern emitted by an active illumination component.

Some active illumination components $S_I$ use a light emitter such as a laser and one or more optical elements to generate a collimated beam having a pattern. In some systems, this emitter operates in an infrared wavelength (e.g., 750 nm or greater) in order to make the pattern invisible to the naked eye. Commonly, one or more diffractive optical elements are used to replicate an incident collimated beam to form a collection of collimated beams which comprise the illumination pattern. The beams may be non-overlapping or have substantially no overlap. FIG. 2 is an example of a pattern emitted by an illumination component $S_I$.

FIGS. 3A and 3B are schematic illustrations of computing devices having an integrated front facing depth acquisition system and an integrated rear facing depth acquisition system, respectively. When integrating a depth acquisition system 100 including a depth camera 102 and an illumination component 106 into a portable computing device 10 such as a laptop computer, smartphone, and other mobile device, as shown for example in FIGS. 3A and 3B, the thickness (T) (or z-thickness or z-height) of the depth camera along its optical axis may be limited by the desired form factor of the computing device (e.g., a thickness less than 3.5 mm for the illuminator). In addition, these portable computing devices are currently under market pressure to be smaller and thinner.

FIG. 3C is a schematic diagram of a packaged image acquisition component $S_A$ and a packaged active illumination component $S_I$, with x, y, and z axes labeled. As used herein, the z axis corresponds to the main optical axis of the element, e.g., the axis along the field of view of the image acquisition component $S_A$ and the axis along which the illumination component $S_I$ emits light. In many acquisition systems, the thickness of the packaged active illumination component is a limiting factor in the overall thickness of the acquisition system. As such, reducing the thickness of the packaged active illumination component can lead to reductions in the thickness of the acquisition system.

Generally, an illumination component $S_I$ used in such systems has a co-linear optics package in which a light emitting component (e.g., a laser) is aligned on the same axis as various optical components such as a refractive lens and a separate diffractive optical element for generating the pattern. Such an illumination component generally has a thickness of at least 7 mm along the direction of the emission optical axis (or projection optical axis).

FIG. 4 is a schematic illustration of active illumination component for emitting patterned light in an illumination pattern. Generally, an active illumination component includes a light emitter 500, where the light passes through an optical system that shapes the light into the patterned light (e.g., to form the illumination pattern). The light emitter may be an incoherent light source such as a light emitting diode, or may be a coherent light source such as a semiconductor laser. Light emitting diodes and lasers have benefits in their low cost, compact physical dimensions, and reliability. Furthermore, lasers operate with high efficiency and the coherent output of a laser can be used effectively with a diffractive optical element (as described in more detail below) to produce high quality patterns. As such, in one embodiment, the light emitter 500 may be a laser diode (e.g., in a TO-can package).

However, light emitters such as semiconductor laser diodes generally emit light having a large angular spread. For example, an edge emitting laser commonly has a divergence angle of 7° to 11° in the slow axis and 15° to 25° in the fast axis. As another example, a vertical cavity surface emitting laser (VCSEL) commonly emit circular beams with divergence angles in the range of 7° to 25°. As a result of these large divergence angles, the intensity of the emitted light 502 rapidly decreases over its propagation path, thereby reducing the operating range of the active illumination component.

To increase the operating range of the active illumination component, the divergence angle of the output of the light emitter can be reduced by including a collimation optical function (or collimating lens function or positive lens function). Collimated beams have a nearly vanishing beam divergence angle and therefore exhibit high levels of intensity over significantly longer distances than light that has a high angular spread. Collimating the output of the light emitter also keeps power consumption low (e.g., the same power light emitter 500 may be used over a larger operating range). In comparison, if the optical energy from the light source were to be distributed across a similar projection field without collimation, then beam divergence would quickly spread out the optical energy, thereby reducing the signal-to-noise ratio and significantly limiting the operating range of the system.

As shown in FIG. 4, a collimation optical function 520, which may be implemented using a refractive, Fresnel, or diffractive lens, collimates the light emitted from light emitter 500 to produce collimated light 522. A pattern generation optical function 530 can then pattern the collimated beam 522 into patterned light (e.g., a set or pattern of collimated beams) 532 which is projected onto a scene (e.g., the illumination pattern shown in FIG. 2).

The divergence angles of typical semiconductor lasers require an effective focal length of 2 mm to 4 mm to allow collimation of the light. As such, the overall thickness (T) of such a system will include at least the distance (d) of 2 mm to 4 mm between the light emitter 500 and the collimation optical function 520.

In order to shrink the size of the physical package of the active illumination system, the collimation optical function 520 and the pattern generation optical function 530 may be combined into a single physical component. For example, the pattern generation optical function 530 may be implemented on one or more surfaces of a refractive lens that performs the collimation optical function 520. Alternatively, the collimation optical function 520 may be superimposed as a diffractive lens on a diffractive lens that performs a pattern generation optical function 530 (e.g., the collimation optical function 520 and the pattern generation function 530 may be performed by the superposition of two diffractive lenses performing the respective functions). Using this method, the number of components is reduced, further reducing the assembly cost, complexity, and thickness of the active illumination system.

Therefore, in the system shown in FIG. 4, the physical thickness (T) of the package is principally dictated by three factors: the physical thickness of the light emitter 500 (e.g., a laser emitter in a TO-can package), the physical thickness of the optical element implementing the collimation 520 and pattern generation 530 optical functions, and the physical separation or distance (d) between the light emission facet (e.g., the edge of light emitter 500) and the optical element. The total thickness T of the system shown in FIG. 4 will be referred to herein as $T_0$.

The physical separation (d) is dictated in part by the system focal length and the physical separation of the system shown in FIG. 4 is denoted herein as $d_0$. The system focal length also determines the diameter of the collimated output beams in the projection pattern and represents a trade-off in the design of the active illumination system, discussed in more detail in the Appendix.

In view of these restrictions, one aspect of embodiments of the present invention is directed to including an expansion optical function (or negative lens function) to reduce the distance (d) between the light emission facet (e.g., the edge of light emitter 500) and the optical element. In addition, multiple optical functions can be performed by the same physical optical element, thereby further reducing the physical size of the emission device. These multiple optical functions may include an expansion optical function, a positive collimation optical function, and a pattern generation function.

FIG. 5 is a schematic illustration of an active illumination system for emitting patterned light (e.g., a set or pattern of collimated beams in an illumination pattern) having a reduced size along the optical axis (e.g., a reduced thickness $T_1$). The system shown in FIG. 5 is similar to that of the system shown in FIG. 4, but further includes an expansion optical function 510 such as a negative lens. The expansion optical function 510 acts to increase the divergence of the input light from the light emitter 500, effectively expanding the beam diameter in a shorter distance ($d_1$) than it would otherwise (e.g., than it would without an expansion optical function 510). In addition, when used with an edge emitting laser or other light emitters having an elliptical or otherwise asymmetrical output, the expansion optical function 510 may also perform an anamorphic optical function to compensate for the disparity between the divergences of the slow and fast axes, thereby producing a substantially circular output beam. Furthermore, as discussed above, because laser and light emitting diode light sources are monochromatic, the overall optical performance can be made very high when combined with good design and manufacturing processes.

As such, through the addition of an expansion optical function 510, the same effective focal length is achieved while reducing the actual distance between the collimation function 520 and the light emitter 500, thereby reducing the total thickness of the optical system to $T_1$, where $T_1$ is smaller than $T_0$.

The collimation function (or positive collimation function) 520 collimates the output from the expansion optical function 510. Given a particular light emitter 500, the combined negative and positive optical functions permits the emission facet of the light emitter 500 to be placed closer to the principal plane of the collimating lens while preserving a low output beam divergence angle. The positive collimation optical function 520 may be a spherical or aspheric design and can be optimized for the light emission characteristics of the light emitter 500 to improve beam profile quality and low phase and/or intensity distortion. In addition, a cylindrical collimation lens may be used to produce a pattern of lines instead of a pattern of dots in the final projection pattern.

The pattern generation function 530 replicates the collimated input beam across a set of holographic orders. Depending on the collimation function 520 (e.g., whether it is spherical or cylindrical), the pattern generation function may replicate the collimated light 522 into a pattern of points or lines. The collimation function 520 may be implemented using a computer generated hologram and is also known in the art as a Fourier diffractive element.

In embodiments of the present invention, the optical functions of expansion 510, collimation 520, and pattern generation 530 to be performed on the light emitted by the light emitter are combined into a single multi-function optical element. The single optical element is an integrated device (e.g., made of a single piece of optical material) and may be referred to herein as a hybrid optical element (HOE) or a diffractive optical element.

Figure 6:
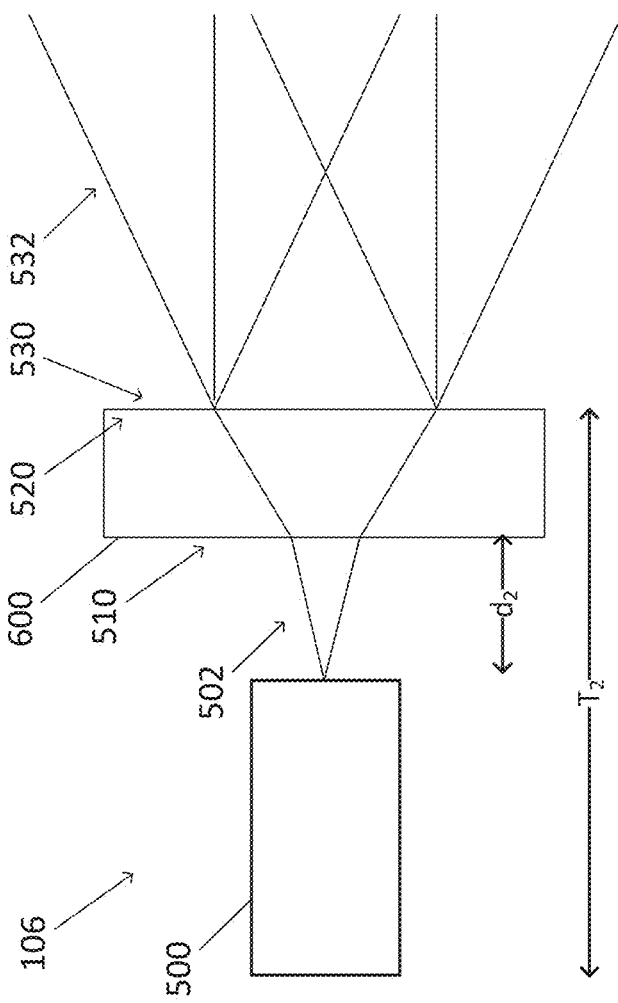
FIG. 6 is a schematic illustration of an optical system according to one embodiment of the present invention for emitting a set or pattern of collimated beams.

FIG. 6 is a schematic illustration of an optical system according to one embodiment of the present invention for emitting a set or pattern of collimated beams. The system of FIG. 6 is substantially similar to FIG. 5, except that expansion 510, collimation 520, and pattern generation 530 optical functions are illustrated as being implemented by a single hybrid optical element 600. In the embodiment shown in FIG. 6, the surface of the HOE 600 facing the light emitter 500 implements the expansion optical function 510 and the surface of the HOE 600 facing away from the light emitter 500 implements both the collimation function 520 and the pattern generation function 530, but embodiments of the present invention are not limited thereto. As shown in FIG. 6, the distance d" between the light emitter 500 and the HOE 600 may be reduced and the overall thickness $T_2$ of the system may also be smaller than that of a system where the three optical functions are implemented by two or more physically separate components that are not integrated into a single hybrid optical element as shown in FIG. 6 (e.g., $T_2$ may be smaller than $T_1$).

Figure 7:
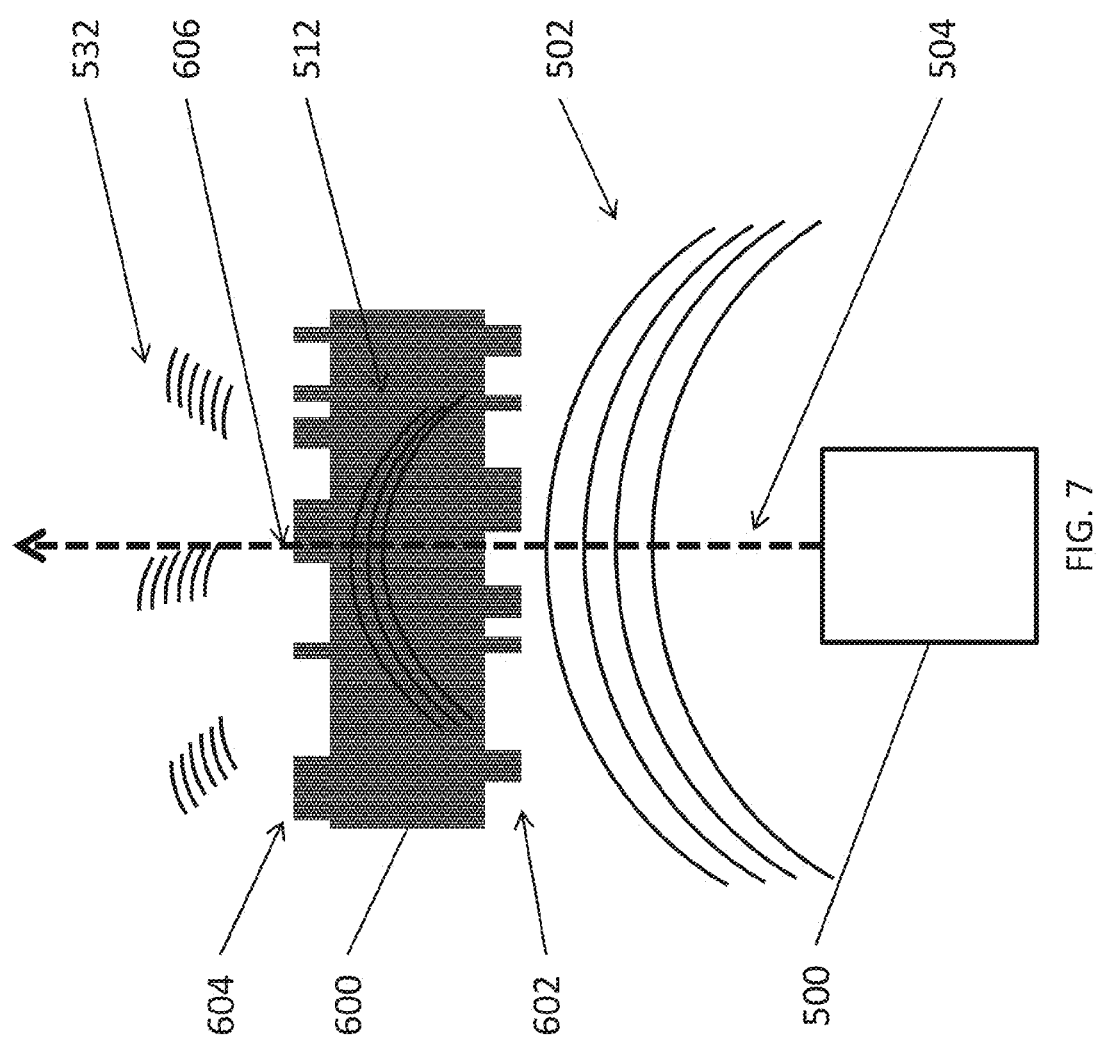
FIG. 7 is a schematic illustration of a hybrid optical element according to one embodiment of the present invention.

FIG. 7 is a schematic illustration of a diffractive optical element according to one embodiment of the present invention. As discussed above, embodiments of the present invention allow implementation of the hybrid optical element 600 as a single physical element that can be produced using existing manufacturing methods at high volume and low cost while delivering high optical performance for the active illumination system.

The hybrid optical element 600 may be implemented using a flat optical element made from a material with high transmission at the wavelength of the light emitter 500. For example, quartz or a plastic polymer may be used as the material for the flat optical element. The light emitter propagation axis 504 passes through the optical axis 606 of the HOE 600. The first side (or first facet) 602 as seen by the propagating beam 502 from the light emitting facet of the light emitter 500 (e.g., the side facing toward the light emitter 500), implements the expansion optical function 510, thereby effectively increasing the beam divergence 512.

The expansion optical function 510 may be implemented as a Fresnel lens or as a diffractive lens. Implementing the expansion optical function as a Fresnel lens or a diffractive lens rather than as a curved, refractive surface allows reduction in overall thickness of the HOE 600, thereby reducing the thickness of the overall active illumination component. In addition, a Fresnel lens or a diffractive lens can be manufactured more cost effectively using existing, low cost techniques. In particular, a large number of components can currently be manufactured on a wafer or substrate at the same time, thereby increasing throughput while taking advantage of the available tight tolerances.

The diverging wavefront 512 then travels through the physical thickness of the HOE 600 before reaching the second side (or second facet) 604 (e.g., the side facing away from the light emitter 500). In the embodiment shown, the second side 604 of the hybrid optical element 600 implements the positive optical (or collimation) function 520 and the pattern generation function 530 to generate the collimated beams 532 (illustrated as wavefronts in FIG. 7). As discussed above, the collimation optical function 520 changes the beam divergence to collimate the beam. The pattern generation function 530 does not change the beam divergence and acts as a Fourier diffractive function, which replicates the collimated beam across a set of desired holographic orders. The collimation optical function 520 and the pattern generation function 530 are mathematically superimposed in phase and physically superimposed and implemented on the second facet 604 of the HOE 600.

As such, multiple optical functions are implemented in the same physical device rather than as physically separate components. In more detail, the HOE 600 implements the expansion optical function 510, the collimation optical function 520, and the pattern generation function 530 in the same hybrid optical element 600, which is manufactured (e.g., etched) from an integral piece (e.g., a piece of quartz or a piece of plastic polymer) to form a micro structure pattern on one or more faces or facets of the integral piece. Because the HOE 600 implements all three of these optical functions, the HOE 600 may be used with a light emitter 500 and without any other optical components (e.g., without another refractive or diffractive element located either between the HOE 600 and the light emitter 500 or with the HOE 600 between the light emitter 500 and the additional element). This reduction in the number of optical elements can further reduce the thickness of the active illumination system.

According to embodiments of the present invention, the hybrid optical element described herein differs both in practical use and fundamental physics from other comparable active illumination systems such as those using multiple diffractive optical elements for tiling a projection pattern. In particular, the integral hybrid optical element changes the divergence of the incident beam and is designed to receive an un-collimated laser beam at its input, effectively eliminating the need for a separate collimation lens.

In addition, beam expansion aspects of embodiments of the present invention differ from existing beam expansion techniques. Some existing optical systems for beam expansion use two lenses in an afocal configuration (e.g., a negative lens followed by a positive lens in a Galilean beam expander or two positive lenses as in a Keplerian beam expander). In contrast, the hybrid optical element according to some embodiments of the present invention is not afocal. These existing optical systems for beam expansion typically have vanishing optical power and are designed to receive a collimated beam as input. However, the system physical thickness of such an existing optical system would need to be greater than that of a hybrid optical element according to embodiments of the present invention in order for these beam expanders to achieve the reduction in beam divergence. This is because, in these beam expanders, the spacing between the lenses is the sum of the focal lengths (accounting for sign convention) whereas the divergence reduction ratio is the absolute ratio of the focal lengths. Therefore, in order to achieve a significant divergence reduction, the focal ratio would need to be very large, as would the spacing between the lenses. In contrast, in a hybrid optical element according to embodiments of the present invention, the spacing between the first facet and the second facet (e.g., the thickness of the HOE itself) is a design and manufacturing degree of freedom.

In more detail, because the first facet 602 of the hybrid optical element 600 performs the expansion function 510 and the second facet 604 performs the collimation and pattern generation functions, increasing the spacing between the first facet 602 and the second facet 604 (e.g., increasing the thickness of the optical element) can increase the performance of the HOE because the thickness of the optical element is a part of the optical length over which the beam diverges. As such, a thicker optical element increases performance, thereby introducing a design choice between optical performance and overall system thickness.

In contrast, in an optical system that used separate optical elements for the various functions, a designer of an optical system would generally attempt to reduce or minimize the thicknesses of each of the optical elements.

Based on ray tracing simulations, a hybrid optical element 600 according to embodiments of the present invention provides a significant benefit over a comparative system that used separate optical elements for collimation and pattern generation, as will be discussed in more detail below. In particular, embodiments of the present invention reduce overall package thickness while delivering high optical performance for the target application. As mentioned previously, the non-vanishing divergence of the laser beam, especially in aggressively thin packages, creates significant practical performance constraints for 3D depth sensing systems. Therefore, the output beam divergence is used as the figure of merit for the system optical performance.

As discussed above, a hybrid optical element 600 according to one embodiment of the present invention is a single physical component that implements a negative lens on a first facet 602 and a combination of a positive lens and a Fourier diffractive element (pattern generator) on a second facet 604. A comparative system may be implemented using a refractive or diffractive collimation function followed by a pattern generation function to produce a similar projection pattern. This comparative system could be implemented using separate physical components. However, for the sake of the below analysis, a hybrid optical element according to embodiments of the present invention will be compared to a comparative system having a dual-function optical element (referred to herein as the "DOE") such as a diffractive collimation lens function superimposed with a Fourier diffractive element and applied to a second facet (e.g., a side of the dual-function optical element facing away from a light emitter), with the first facet (e.g., the side facing toward the light emitter) unmodified (e.g., flat or optically neutral apart from the discontinuity in refractive index).

For the sake of convenience, the pattern generation function or Fourier diffractive function in both implementations will be assumed to be identical in order to focus on comparing the effect of the combination of the negative (expansion) function and the positive (collimation) function of the hybrid optical element to the single collimation function of the comparative example DOE.

For both the hybrid optical element according to embodiments of the present invention and the comparative dual-function optical element, the design strategy is to achieve a particular optical performance (e.g., low divergence of the points in the pattern) while reducing or minimizing package thickness. (The pattern generation function can be superimposed onto the second facet 604 of the optical element without increasing thickness.)

For the calculations in the simulations discussed below, the light emitter is assumed to be an edge emitting semiconductor laser and the following fixed parameters are assumed, based on the performance of current technology.

TABLE 1

| Parameter | Value | Units |
| --- | --- | --- |
| Laser Wavelength | 850 | nm |
| Laser Divergence Angle | 7 | degrees |
| HOE/DOE Material Refractive Index | 1.57 | — |
| HOE/DOE Physical Thickness | 0.5-0.8 | mm |
| Laser - HOE/DOE Spacing | 1.0-2.4 | mm |
| DOE Collimation Focal Length (f) | 2.5 | mm |
| HOE Negative Lens Focal Length ($f_1$) | 1.7 | mm |
| HOE Positive Lens Focal Length ($f_2$) | 1.2 | mm | where the Laser Divergence Angle refers to the slow axis divergence of an edge-emitting laser light emitter.

Figure 8:
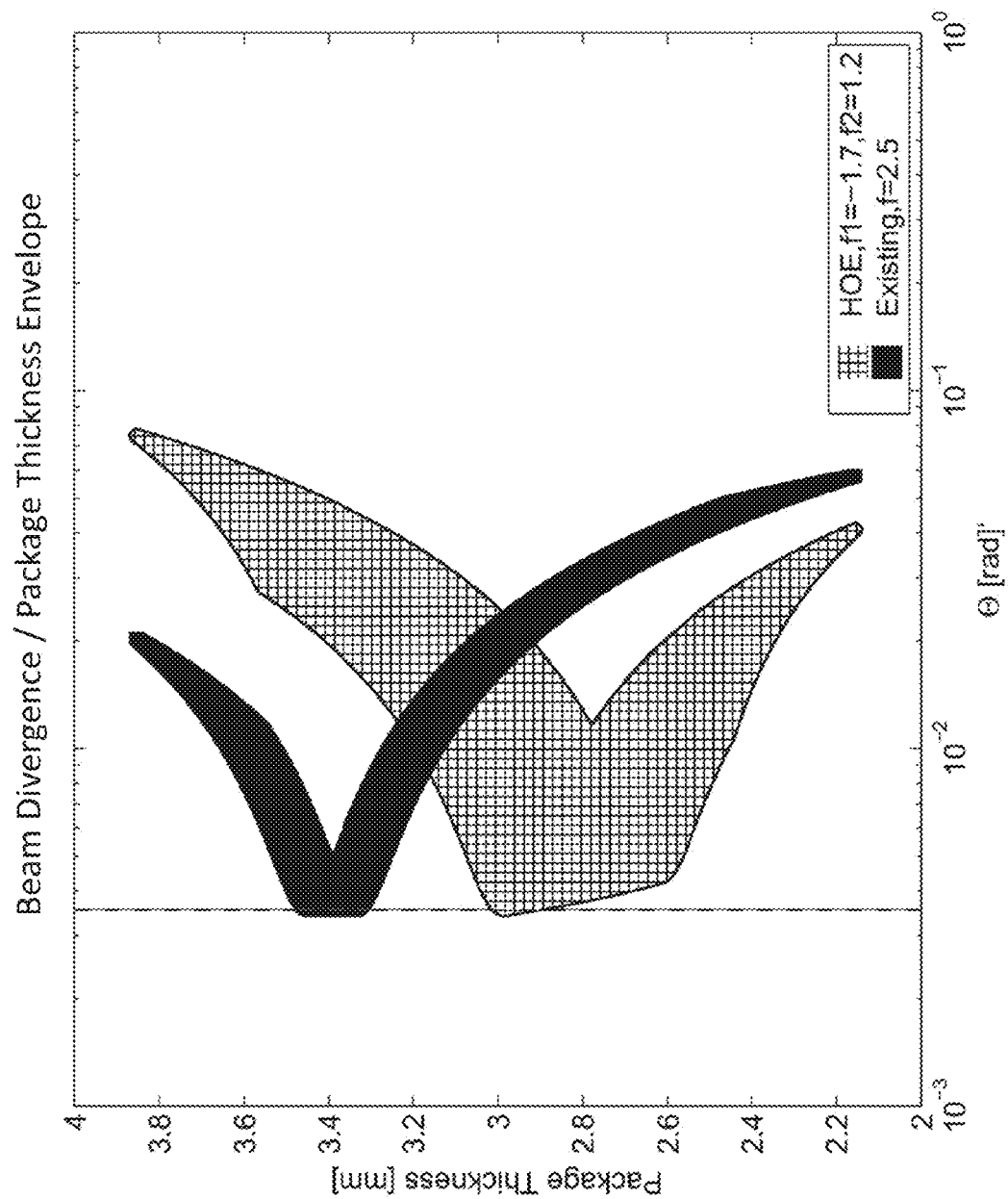
FIG. 8 is a graph comparing performance an optical system according to one embodiment of the present invention having a hybrid optical element and that of a system having a dual function diffractive optical element without an expansion optical function.

FIG. 8 is a graph comparing performance an optical system according to one embodiment of the present invention having a hybrid optical element and that of a system having a dual function diffractive optical element without an expansion optical function. FIG. 8 illustrates the envelopes for a hybrid optical element (shown with a grid pattern, labeled "HOE") and a dual-function optical element (shown in solid, labeled "Existing") for various combinations of optical element thickness and spacing (d) between the laser emitter and the optical element. The modeled hybrid optical element in this example has a negative (expansion) function focal length $f_1$ of −1.7 mm and a positive (collimation) function focal length $f_2$ of 1.2 mm. The modeled dual-function optical element has a focal length f of 2.5 mm. The vertical axis (or y-axis) shows the total package thickness in millimeters, assuming a particular fixed laser diode thickness, and the horizontal axis (or x-axis) gives the divergence of the output beam in radians. As discussed above, there are commercial benefits to thinner packages for integration into thin form factor computing devices and there are performance benefits to smaller beam divergence angles.

For any given output beam divergence in FIG. 8 (e.g., along any particular vertical line), the hybrid optical element provides a set of configurations that can be made thinner than a comparative dual-function optical element while maintaining the same optical performance. For example, the DOE envelope shows that the set of DOEs having beam divergence of about $3.3 \times 10^{-3}$ rad (shown by the vertical line in FIG. 8) have thicknesses between 3.3 mm and 3.5 mm. In contrast, the HOE envelope shows that the set of HOEs having the same beam divergence of $3.3 \times 10^{-3}$ rad have thicknesses at around 3 mm. Therefore, a hybrid optical element according to embodiments of the present invention can exhibit significant thickness (or volume) reductions over a system using a comparable dual-function optical element.

Figure 9:
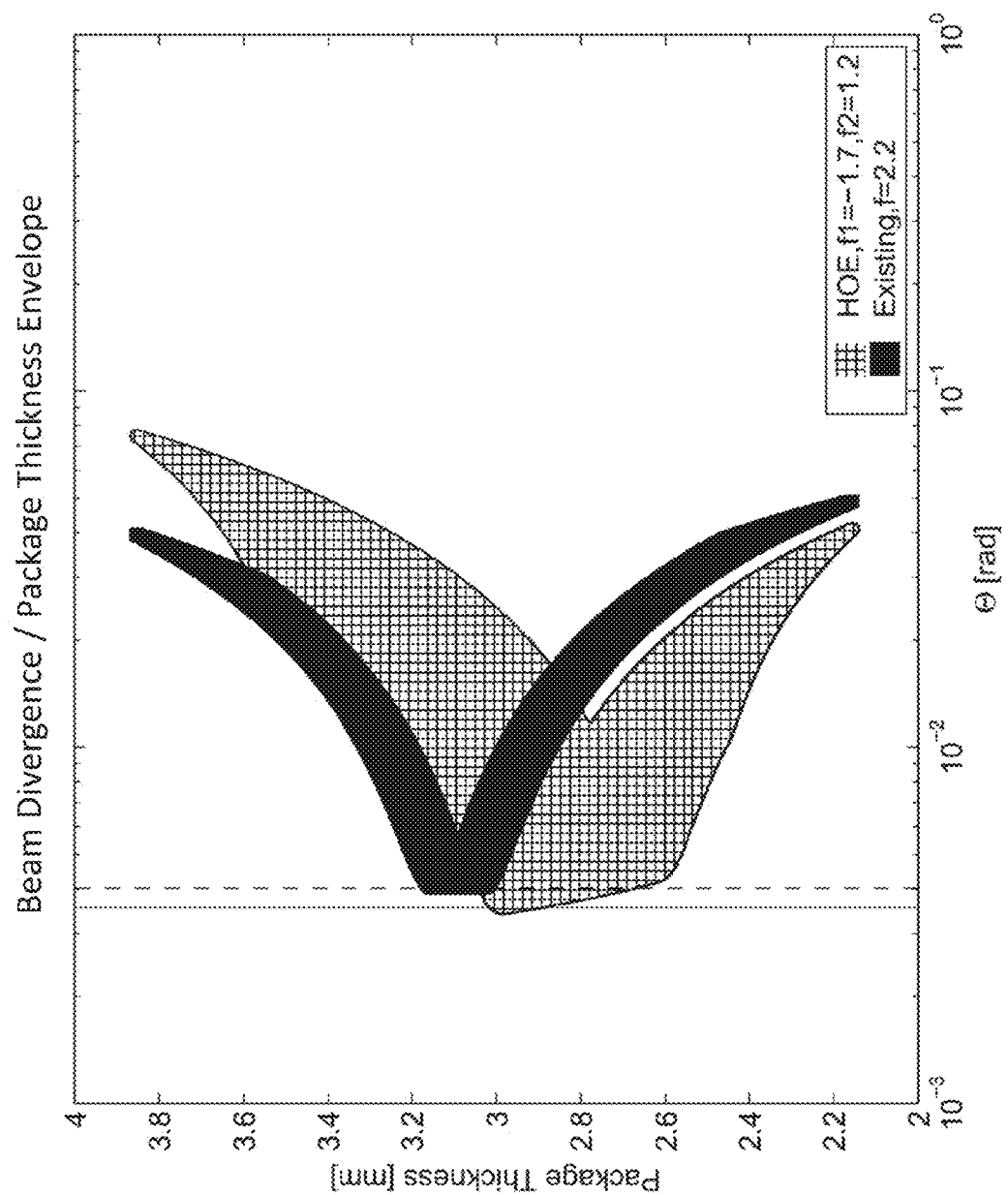
FIG. 9 is a graph comparing performance an optical system according to one embodiment of the present invention a hybrid optical element and that of a system having a dual function diffractive optical element without an expansion optical function.

Attempting to reduce the package thickness while using the dual-function optical element can result in significant performance degradation. FIG. 9 is a graph comparing performance of an optical system using a hybrid optical element according to one embodiment of the present invention and that of a system having a dual function diffractive optical element without an expansion optical function. This graph is similar to that shown in FIG. 8, where the parameters of the hybrid optical element are the same ($f_1=-1.7$ and $f_2=1.2$), except that the collimation focal length f for the dual-function optical element has been reduced from f=2.5 mm to f=2.2 mm to allow closer placement of the emission facet of the laser emitter to the dual-function optical element.

However, despite the 0.3 mm reduction in package thickness due to the shorter focal length, the minimum achievable output beam divergence is compromised (vertical dashed line indicating a lower edge of the beam divergence of the dual-function optical element has shifted to the right to about $4 \times 10^{-3}$ rad). In contrast, the hybrid optical element according to embodiments of the present invention can be designed to achieve improved optical performance with similar package thickness, substantial thickness reduction with similar performance, or a combination of those benefits with improvements somewhere in between. Furthermore, a hybrid optical element alleviates the need to optically align physically separate components (e.g., multiple refractive lenses), thereby improving precision, and thereby reducing assembly costs.

In addition, the performance of the hybrid optical element according to embodiments of the present invention can be further improved by optimizing the focal lengths $f_1$ and $f_2$ of the negative (expansion) and positive (collimation) lens functions, respectively, for a particular system using optical modeling software.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

Various embodiments of the present invention may be used with one or more cameras in a physically thin depth sensor module.

For example, in one embodiment of the present invention, a laser package is used in which an edge emitting semiconductor laser is mounted to emit light along a direction perpendicular (or non-parallel) to the projection axis of the active illumination component (e.g., arranged to emit light along a direction parallel to the printed circuit board to which the active illumination component is mounted). The emitted laser may then be deflected (or reflected) by 90 degrees and redirected onto the hybrid optical element.

In one embodiment, a standard TO-can laser diode package containing an edge emitting diode laser or vertical cavity surface emitting laser is used with the hybrid optical element. As discussed above, in the case of an edge emitting laser, the hybrid optical element may implement an anamorphic optical function in order to compensate for disparity between the divergences of the slow and fast axes of the beam.

In one embodiment of the present invention, a bi-focal collimation function is used in order to provide robustness against errors in the placement of the laser and/or the optical element. As mentioned previously, the HOE is located at a distance from the emission point of the semiconductor laser. Manufacturing tolerances, cost, and environmental effects during operation limit the accuracy of this placement. Such errors in the placement may result in suboptimal collimation of the laser beam and reduce the pattern fidelity. Therefore, in some embodiments of the present invention, a bi-focal collimation function is used to extend the range of placement distances between the hybrid optical element and the light emitter. Although the bi-focal collimation function may also introduce aberration into the beam, in some embodiments of the present invention the hybrid optical element also includes an aberration pre-correction function superimposed onto the first facet of the hybrid optical element (e.g., superimposed with the expansion optical function).

Figure 10:
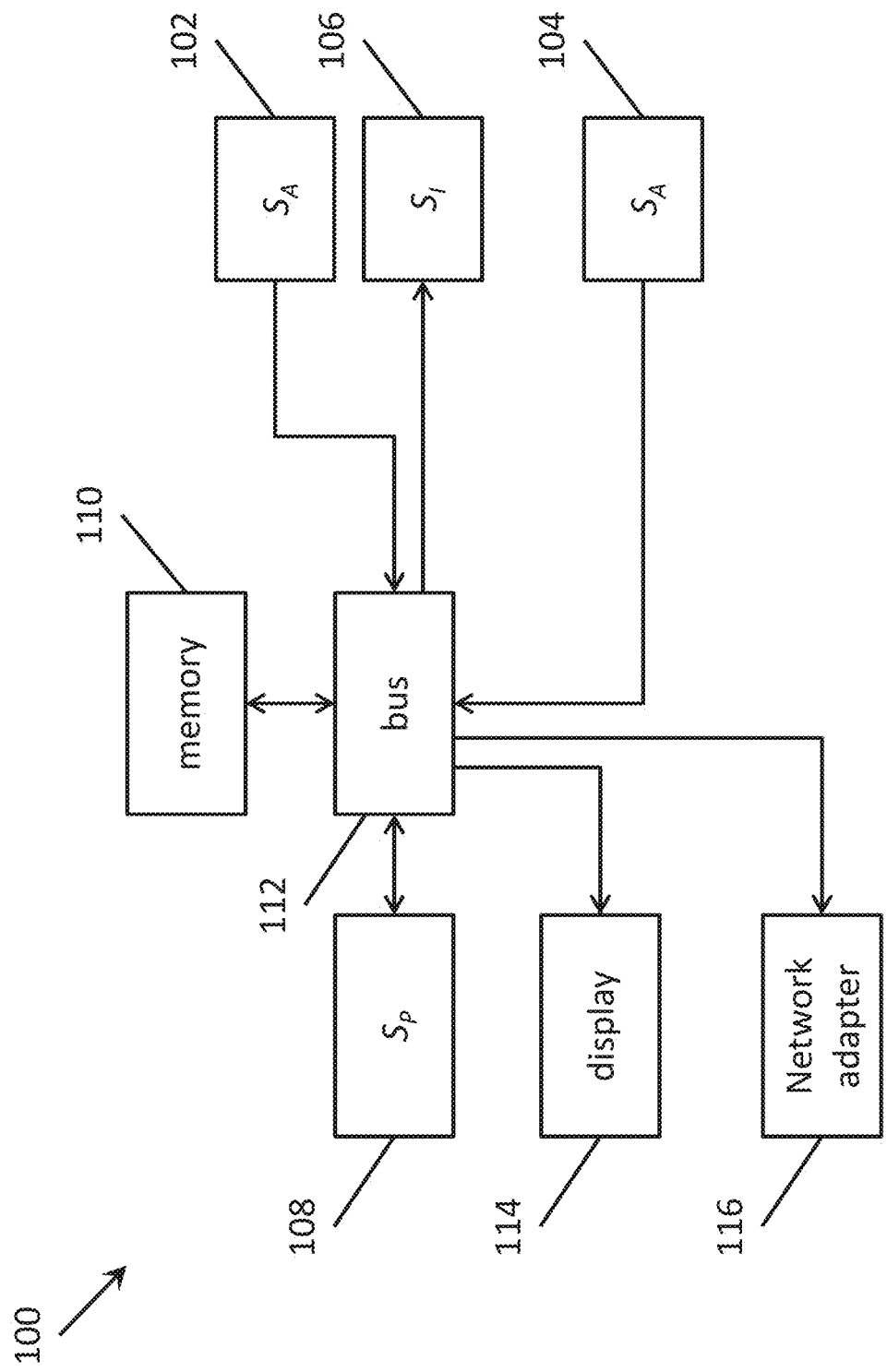
FIG. 10 is a block diagram of a depth camera system according to one embodiment of the present invention.

FIG. 10 is a block diagram illustrating a depth camera system according to one embodiment of the present invention. As described above, generally, an active depth camera includes an active illumination component $S_I$ 106, an image acquisition component $S_A$ including a camera 102 (the embodiment in FIG. 6 shows a second camera 104 for stereo imaging, but embodiments of the present invention are not limited thereto), and a processing component Sp 108, where the processing component implements a depth estimation algorithm.

The illumination component $S_I$ illuminates the scene with diffuse or collimated light which can be constant over time, pulsed, or otherwise modulated. The illumination may be concentrated at a single wavelength or span a range of wavelengths.

The image acquisition component $S_A$ acquires image information from the scene, which includes both ambient illumination and illumination from the active illumination component $S_I$. The captured image information may be stored in a plurality of frames, which may be acquired at regular intervals, such as at a frequency in the range of 5 Hz to 500 Hz. The image acquisition component $S_A$ may include a single image sensor or multiple image sensors. Each image sensor or image sensors may be, for example, a semiconductor charge coupled device (CCD) image sensor or a complementary metal-oxide-semiconductor (CMOS) image sensor.

The processing component $S_P$ processes the captured image information and generates an estimated depth map of the scene $I_D$ using any of a variety of techniques for generating a depth map using active illumination, such as those described in more detail in R. Szeliski. "Computer Vision: Algorithms and Applications," Springer, 2010. In various embodiments of the present invention, the processing component $S_P$ may be any computing device capable of performing the processing of the captured images such as: a general purpose processor coupled to memory storing instructions to be executed by the processor; a graphics processing unit (GPU); a field programmable gate array (FPGA) configured to perform the processing; an application specific integrated circuit (ASIC) designed to perform the processing; or combinations thereof. In addition, in some embodiments, the computations may be spread across multiple processing components operating in parallel and/or in series.

Appendix—System Focal Length Trade-Offs
Physical Model for Laser Beam

In what follows, a simple physical model is presented for the output beam of a single-mode semiconductor laser diode light source, which serves as a vehicle for staging the theory behind aspects of the present invention. Note that even though in practice more sophisticated and accurate models may be used in optoelectronic design and simulations, the basic nature of the relevant physical phenomenon described here can be sufficiently well understood using the approximations used here. Several commercial and non-commercial software packages such as Zemax OpticStudio or Lambda Research OSLO are available for performing such simulation and modeling.

The output beam of single mode semiconductor laser in free space can be mathematically modeled as a Gaussian beam. For simplicity, an axially symmetric beam in the paraxial regime will be described below. The considerations may also be extended to cases of non-axially-symmetric beams. At distance z along the beam propagation axis and at distance r from the optical axis—measured perpendicular to the axis in a transverse plane—the time-averaged optical intensity can be calculated as:

$$I(r, z) = I_0 \left(\frac{w_0}{w(z)}\right)^2 \exp\left(-\frac{2r^2}{w^2(z)}\right)$$

where $I_0$ is the peak intensity of the beam at the minimum beam waist location, and $w(z)$ is the half-width-half-maximum beam waist at distance z. If the origin of the reference frame is defined at the minimum beam waist, the full-width-half-maximum (FWHM) beam waist at a distance z along the propagation axis can be calculated from:

$$w(z) + 2w_0 \sqrt{1 + \left(\frac{z}{z_R}\right)^2}$$

where $z_R$ is the Rayleigh range for a coherent monochromatic beam at wavelength $\lambda$ and minimum beam waist $2w_0$:

$$z_R = \frac{\pi w_0^2}{\lambda}$$

The FWHM beam divergence angle $\Theta$ can be calculated from:

$$\tan\left(\frac{\Theta}{2}\right) = \frac{w_0}{z_R}$$

Within this context, a collimated beam refers to a beam with full divergence angle smaller than a few thousandths of a radian (mrad). Whilst propagating in the free space—neglecting any aperture functions—the Gaussian beam profile is fully described by the propagation axis, the minimum beam waist $2w_0$ and its location, and the maximum intensity $I_0$. Furthermore, the divergence angle and the minimum beam waist are related and one may be computed from the other.

When the beam passes through a lens function with non-zero optical power, the divergence angle of the beam is changed. For the purpose of demonstrating the fundamental trade-off involved in the design of the projection system for 3D depth system, a simple lens function within in the paraxial regime is described below.

A simple spherical lens function with focal length f and an incident Gaussian beam having FWHM divergence angle $\Theta$. If the minimum beam waist of the incident Gaussian beam is placed at the back focal distance of the lens, the output beam following the operation of the lens function, will have a minimum FWHM beam waist $\Omega$ given by:

$$\Omega \approx 2f\sin\left(\frac{\Theta}{2}\right)$$

Note that, in the present approximations, this output beam is described using Gaussian beam models. Details such as the beam $M^2$ and various distortions which are considered during the design of the system are not critical to describing the fundamental trade-off described below and therefore these details are not discussed in detail.

System Focal Length Trade-Off

Based on the approximations discussed above, the focal length of the collimation function $f$ is proportional to the minimum FWHM beam waist of the collimated beam $\Omega$. Furthermore, the minimum FWHM beam waist is inversely proportional to the beam FWHM divergence angle. Note that the divergence angle of the collimated beam, albeit small, is non-vanishing. The non-vanishing divergence angle affects the overall system performance in two ways, as explained below. Note that "system" here refers to the "projection system" or "active illumination system" for generating a point cloud of collimated beams. Such a system includes a coherent light source (e.g. a semiconductor laser light source), a collimation function, and a pattern generation function.

The non-vanishing divergence of the collimated beam causes the laser spots in the projected point cloud to grow in diameter during propagation. The optical energy present in each beam does not increase over the propagation distance. Instead, the optical energy is either almost constant (when neglecting atmospheric loss and diffraction), or it decreases (in the presence of such atmospheric loss and diffraction effects). Therefore, the growth in beam diameter, $w(z)>w_0$, results in a decrement of the peak spot intensity, as given by:

$$I_{max}(z) = I_0 \left(\frac{w_0}{w(z)}\right)^2$$

where $I_{max}(z)$ is the maximum intensity of the beam at a distance z from the projection module, and $I_0$ is the intensity of the beam at the projector (e.g., where z=0). This effect directly impacts the SNR of the return signal as sensed by the imaging sensor(s), thereby effectively limiting the accuracy and the operating range of the system.

The pattern generation function or Fourier diffractive element used for generating the pattern (e.g. a point cloud) is designed to optically replicate the input beam onto a set of "holographic orders" or "direction-cosine orders" in the far field (e.g., in some embodiments, greater than about 100 mm to 200 mm). For the sake of discussion, these orders will be considered as quantized directions along lines originating at the projection system and extending towards the field of projection, as shown in FIG. 4. Note that these directions are quantized with equal spacing in the direction cosine domain. The angular spacing between two adjacent holographic orders 532 (e.g., two adjacent points or lines in the pattern) in the horizontal and vertical directions, shown in FIG. 4 can be approximated by:

$$d\theta_h \approx \cos\left(\frac{a\cos\left(\frac{FOV_H}{2}\right)}{M}\right)$$

$$d\theta_v \approx \cos\left(\frac{a\cos\left(\frac{FOV_V}{2}\right)}{N}\right)$$

where $FOV_H$, $FOV_V$ are the full angle field of projection and M, N are the total number of holographic orders in the horizontal and vertical directions, respectively.

In depth sensing systems, an increase the number of holographic orders can result in a denser projection pattern, which can improve the spatial resolution of the measurements (to the extent permitted by overall available system power and computational resources) because a higher resolution pattern results in higher resolution detection of the shape of features in the scene. In addition, higher resolution patterns can provide more data for analysis by higher resolution cameras.

However, as can be seen from the relation above, for a given angular field of projection, increasing the pattern density requires a smaller angular spacing between the holographic orders. This results in a limit on the focal length of the projection system. Specifically, the focal length cannot be reduced beyond the point where the divergence of the individual laser beams as given by:

$$2f\sin\left(\frac{\Theta}{2}\right)$$

exceeds the angular spacing of the holographic orders. If this is violated (by more than a small margin), the laser spots from adjacent holographic order will, at a certain distance, overlap and smear out the projected pattern.

Therefore, there is a fundamental trade-off associated with designing a miniaturized projection system using a Fourier diffractive element for pattern generation:

From an optics and system performance point of view, it is desirable to have a large laser collimation focal length. This reduces the output beam divergence and enables a denser projection pattern (better spatial resolution) and a higher signal quality in the operating range (smaller beam divergence angle). However, a longer focal length results in laser spots that are initially larger (e.g., large at distances close to the projection system) but that stay more constant over the propagation distance, whereas a shorter focal length would result in spots that are initially small (e.g., small at distances close to the projection system) but would grow faster over the propagation distance. Therefore, when using a longer focal length, the initially larger beams may overlap at shorter distances before becoming more spaced apart at longer distances. As such, the designed minimum working distance of the system sets an upper limit for the focal length.

For example, in some embodiments of the present invention, an effective focal length of 2.5 mm-7 mm would be possible. The 7 mm extreme has better optical performance in working distances of about 70 cm to 5 m, but it would have poor performance in the 30 cm-50 cm range. The 2.5 mm focal length may be used for 30 cm-50 cm operation, but it would have poorer optical performance from 70 cm to 5 m.

From a packaging and product industrial design point of view, however, it is often desirable to a have a small focal length that permits compact packaging of all optical components and a minimization of the projection module thickness. This is relevant in mobile consumer devices which have stringent thickness requirements. This market segment includes smartphones, tablet computers, and laptop and notebook computers. In such products, thickness reductions on the order of 0.5-1.0 mm can be the deciding factor in whether a 3D depth sensing system can be integrated into a product and therefore, even small reductions in thickness can have a significant impact on commercial viability.

Aspects of embodiments of the present invention, as discussed above, enable high optical performance and significant package thickness reduction compared to the existing art for small or marginal increases in manufacturing cost.

What is claimed is:

1. A projection system configured to emit patterned light along a projection optical axis, the projection system comprising:
    a diffractive optical element having a first facet and a second facet, the first facet being configured to perform an expansion optical function and the second facet being configured to perform a collimation optical function and a pattern generation function; and
    a light emitter configured to emit light toward the diffractive optical element,
    wherein the collimation optical function is configured to collimate the light emitted from the light emitter, and
    wherein the pattern generation function is configured to replicate the collimated light to produce the patterned light,
    wherein the expansion optical function of the diffractive optical element defines an effective focal length (f) and a focal point at a distance (d) from the diffractive optical element, the effective focal length being larger than the distance, and
    wherein the light emitter is located at the focal point at the distance (d) from the diffractive optical element.

2. The projection system of claim 1, wherein the projection system has a thickness less than 3.2 mm and wherein the patterned light has a beam divergence less than $4.0 \times 10^{-3}$ radians.

3. The projection system of claim 1, wherein the collimation optical function is spherical and wherein the patterned light comprises a plurality of points.

4. The projection system of claim 1, wherein the collimation optical function is cylindrical and wherein the patterned light comprises a plurality of lines.

5. The projection system of claim 1, wherein the light emitter is a coherent light source.

6. The projection system of claim 1, wherein the light emitter is a light emitting diode.

7. The projection system of claim 1, wherein the projection system is a component of a depth acquisition system, the depth acquisition system further comprising a camera configured to image a scene in a direction of the projection optical axis.

8. The projection system of claim 7, wherein the camera is a stereo camera.

9. A diffractive optical element having:
a first facet configured to perform an expansion optical function; and
a second facet configured to perform a collimation optical function and a pattern generation function,
wherein the collimation optical function of the diffractive optical element is a bi-focal collimation function,
wherein the bi-focal collimation function generates optical aberrations, and
wherein the expansion optical function corrects the optical aberrations.

10. The diffractive optical element of claim 9, wherein the pattern generation function and the collimation optical function are superimposed on the second facet.

11. A method for applying patterned light to a scene, the method comprising:
supplying power to a light emitter configured to emit monochromatic light toward a diffractive optical element, the diffractive optical element having a first facet and a second facet, the first facet being configured to perform an expansion optical function and the second facet being configured to perform a collimation optical function and a pattern generation function;
expanding, by the expansion optical function, the light emitted from the light emitter to generate divergent light;
collimating, by the collimation optical function, the divergent light to generate collimated light; and
replicating, by the pattern generation function, the collimated light to produce the patterned light,
wherein the expansion optical function of the diffractive optical element defines an effective focal length (f) and a focal point at a distance (d) from the diffractive optical element, the effective focal length being larger than the distance, and
wherein the light emitter is located at the focal point at the distance (d) from the diffractive optical element.

12. The method of claim 11, wherein the collimation optical function of the diffractive optical element is a bi-focal collimation function.

13. The method of claim 12, wherein the bi-focal collimation function generates optical aberrations, and
wherein the expansion optical function corrects the optical aberrations.

14. The method of claim 11, wherein the collimation optical function is spherical and wherein the patterned light comprises a plurality of points.

15. The method of claim 11, wherein the collimation optical function is cylindrical and wherein the patterned light comprises a plurality of lines.

16. The method of claim 11, wherein the light emitter is a coherent light source.

* * * * *